(12) United States Patent
Liu et al.

(10) Patent No.: US 7,275,965 B1
(45) Date of Patent: Oct. 2, 2007

(54) TESTING TOOLS FOR I/O PORTS

(75) Inventors: Ping Liu, Shenzhen (CN); Li-Ping Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,050

(22) Filed: Jun. 14, 2006

(30) Foreign Application Priority Data

Mar. 14, 2006 (CN) .................... 200620056548.9

(51) Int. Cl.
*H01R 24/00* (2006.01)
*G06F 11/00* (2006.01)

(52) U.S. Cl. ........................................ 439/632; 714/43

(58) Field of Classification Search .............. 439/632, 439/627–631, 246, 329; 714/43, 723; 324/424, 324/754
See application file for complete search history.

(56) References Cited

U.S. PATENT DOCUMENTS

| | | | | |
|---|---|---|---|---|
| 3,016,489 A | * | 1/1962 | Briggs et al. | 324/754 |
| 4,489,414 A | * | 12/1984 | Titherley | 714/723 |
| 4,998,067 A | * | 3/1991 | Puckett et al. | 324/424 |
| 5,557,741 A | | 9/1996 | Jones | |
| 2003/0229746 A1 | * | 12/2003 | Liu et al. | 710/301 |
| 2004/0009702 A1 | * | 1/2004 | Potega | 439/578 |
| 2004/0227637 A1 | * | 11/2004 | Barr et al. | 340/687 |
| 2006/0080488 A1 | * | 4/2006 | Lee | 710/301 |
| 2006/0159233 A1 | * | 7/2006 | Cotton et al. | 379/22 |
| 2006/0232950 A1 | * | 10/2006 | Miyawaki et al. | 361/796 |
| 2006/0264085 A1 | * | 11/2006 | Kwatra et al. | 439/329 |

* cited by examiner

*Primary Examiner*—Chandrika Prasad
(74) *Attorney, Agent, or Firm*—Wei Te Chung

(57) ABSTRACT

A testing tool for testing an I/O port includes a cable and a testing card. The cable includes a port formed at one end thereof configured for being connected to the I/O port, and a first connector formed at an opposite end thereof. The testing card includes two testing circuits and a second connector connected to the first connector. The second connector includes a slider shiftable between a first position where the second connector and a testing circuit are interconnected, and a second position where the second connector and the other testing circuit are interconnected.

17 Claims, 7 Drawing Sheets

TESTING TOOLS FOR I/O PORTS

FIELD OF THE INVENTION

The present invention relates to testing tools for computer systems, more particularly to a testing tool including a testing card having different testing circuits.

DESCRIPTION OF RELATED ART

Normally, in a computer manufacturing process, testing is an important step to ensure reliability of a manufactured computer system. The testing includes both hardware and software testing for the computer system and its components.

For example, for testing an I/O port, a plurality of different testing tools including different testing circuits is required to test the I/O port. It is time-consuming to link the I/O port to different testing tools. In addition, the I/O port may be damaged during the linking to different testing tools.

It is therefore desirable to find a new testing tool which can overcome the above mentioned problems.

SUMMARY OF THE INVENTION

A testing tool for testing an I/O port includes a cable and a testing card. The cable includes a port formed at one end thereof configured for being connected to the I/O port, and a first connector formed at an opposite end thereof. The testing card includes two testing circuits and a second connector connected to the first connector. The second connector includes a slider shiftable between a first position where the second connector and a testing circuit are interconnected, and a second position where the second connector and the other testing circuit are interconnected.

Other advantages and novel features will be drawn from the following detailed description of preferred embodiments with attached drawings, in which:

DETAILED DESCRIPTION OF THE INVENTION

Figure 1:
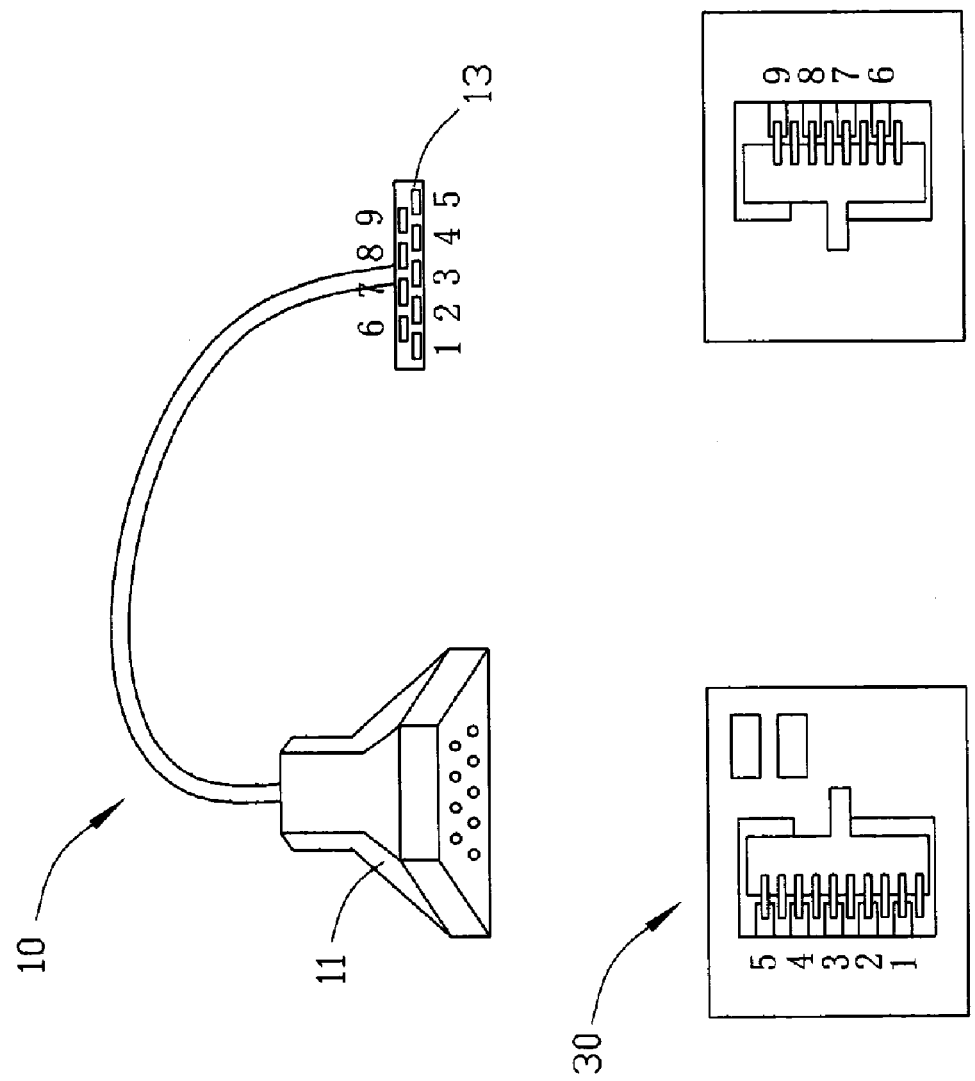
FIG. 1 is an exploded view of a testing tool in accordance with a preferred embodiment of the present invention, including a cable with a first connector, and a testing card shown a front and a rear aspects thereof.

Referring to FIG. 1, a testing tool for testing ports of a computer system in accordance with a preferred embodiment of the present invention, includes a cable 10 and a testing card 30.

The cable 10 includes a port 111 integrated at one end of the cable 10. The port 111 is adapted to connect to an input/output (I/O) port (not shown) for testing. The port 11 is a serial port or a parallel port in accordance with the I/O port. A first connector 13 is integrated at the other end of the cable 10. The first connector 13 is linked to the port 111 via the cable 10. A type of the first connector 13 is in accordance with a type of the port 11. If the port 11 is a serial port, the first connector 13 is a serial connector, and if the port 11 is a parallel port, the first connector 13 is a parallel connector.

Figure 2:
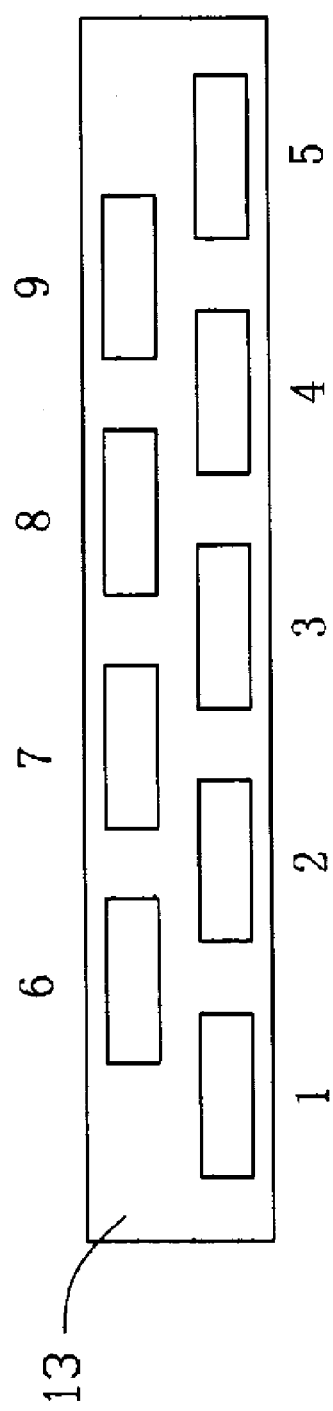
FIG. 2 is a sketch view of a first structure of the first connector of FIG. 1.
Figure 3:
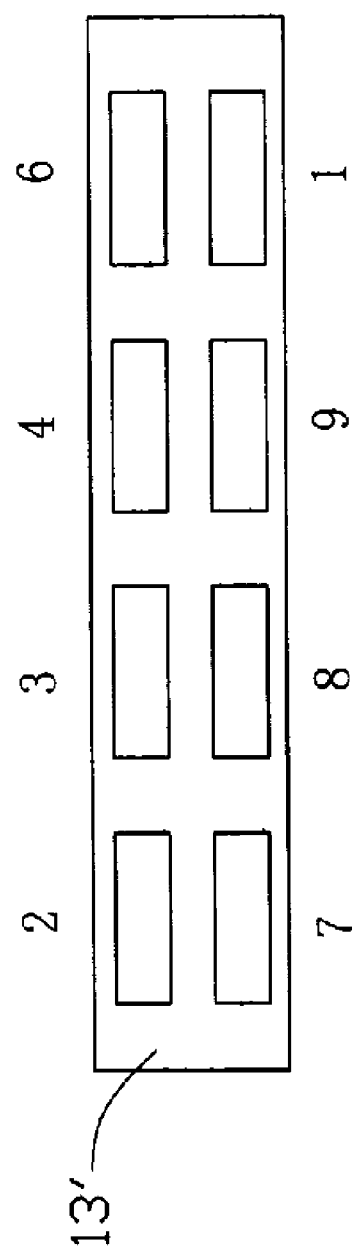
FIG. 3 is a sketch view of a second structure of the first connector of FIG. 1.
Figure 4:
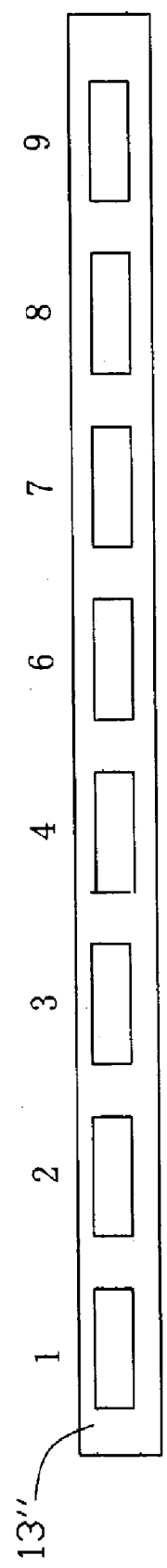
FIG. 4 is a sketch view of a third structure of the first connector of FIG. 1.

The first connector 13 may have different structures. Referring to FIGS. 2-4, three variations in the structure of the first connector 13 are shown as an example. Referring to FIG. 2, in the first structure of the first connector 13, the first connector 13 is a 9 pin serial connector complying with the mechanical standard of a 9 pin serial port. Pins 1, 2, 3, 4, and 5 are aligned in one line, and pins 6, 7, 8, and 9 are aligned in another line. The pins 1 to 9 are electrically connected to the corresponding pins of the port 11. Because the structure complies with the mechanical standard of the 9 pin serial port, it is convenient to test.

Referring to FIG. 3, in the second structure of the first connector 13', the pin 5 is omitted, and the pins 2, 3, 4, and 6 are arranged in a row parallel to pins 7, 8, 9, and 1 which are also arranged in a row. Because the pin 5 is used to connect to ground, it is omitted. The pins are aligned according to frequency of use of the pins in the test process. The pins aligned in this order can simplify a corresponding circuit on the testing card 30.

Referring to FIG. 4, in the third structure of the first connector 13'', the pins 1 to 4 and 6 to 9 are aligned in a row, and the pin 5 is omitted. The pins are aligned according to pin's sequence number, so it is easy to ascertain each pin and convenient to test.

If the first connector 13 is a parallel connector, pins of the parallel connector can be aligned in different orders, such as complying with standard structure of the parallel connector, or according to the pin's sequence number, or according to frequency of use of the pins in the test process.

Figure 5:
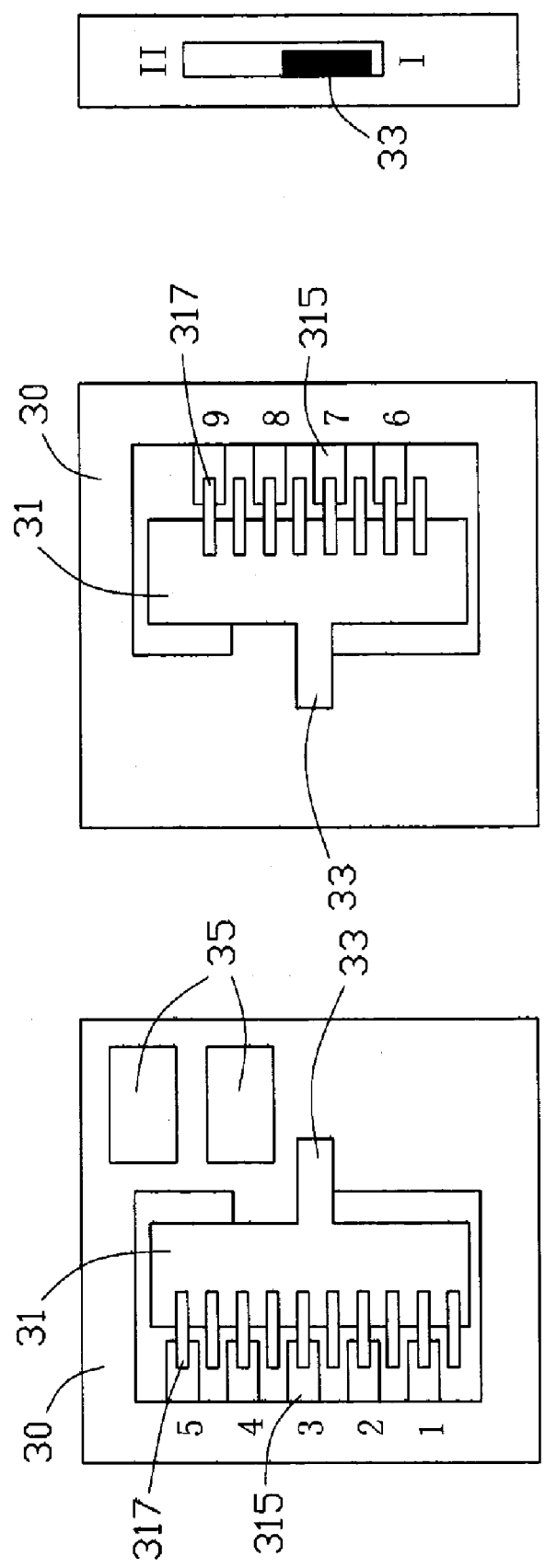
FIG. 5 is a sketch view of the testing card of FIG. 1, showing a front, a back, and a top aspects of the testing card.

Referring to FIG. 5, the testing card 30 includes two testing circuits 35 set thereon. These testing circuits 35 are used to test different aspects of the I/O port. The testing card 30 also includes a second connector 31 adapted to connect to the first connector 13.

The second connector 31 has a slider 33, and a plurality of pads 315. Each of the plurality of pads 315 is connected to a corresponding pin of the plurality of pins of the first connector 13. The plurality of pads 315 are aligned in a same order as the pins 1 to 9 of the first connector 13.

The slider 33 is slidable between a first position and a second position. The slider 33 includes eighteen contact pieces 317 with one aspect of the slider 33 having ten contact pieces 317 and another aspect having eight contact pieces 317. The eighteen contact pieces 317 are divided into two groups with each group having nine contact pieces 317. Each group of contact pieces 317 is connected to one of the two testing circuits for testing different aspects of the I/O port. One group of contact pieces 317 is aligned alternately with the other group of contact pieces 317.

When the slider 33 slides to the first position, one group of contact pieces 317 contacts to the nine pads 315 for testing the I/O port by one testing circuit. When the slider 33 slides to the second position, the other group of the contact pieces 317 contacts to the nine pads 315 for testing the I/O port by the other testing circuit. By easily sliding the slider 33, the I/O port is tested by different testing circuits. It is convenient to test the component without changing with another testing card and connecting the testing card to the component.

In the above-mentioned embodiment, the slider 33 may also be configured to slide between three or more positions, to accommodate the addition of corresponding groups of contact pieces and testing circuits.

Figure 6:
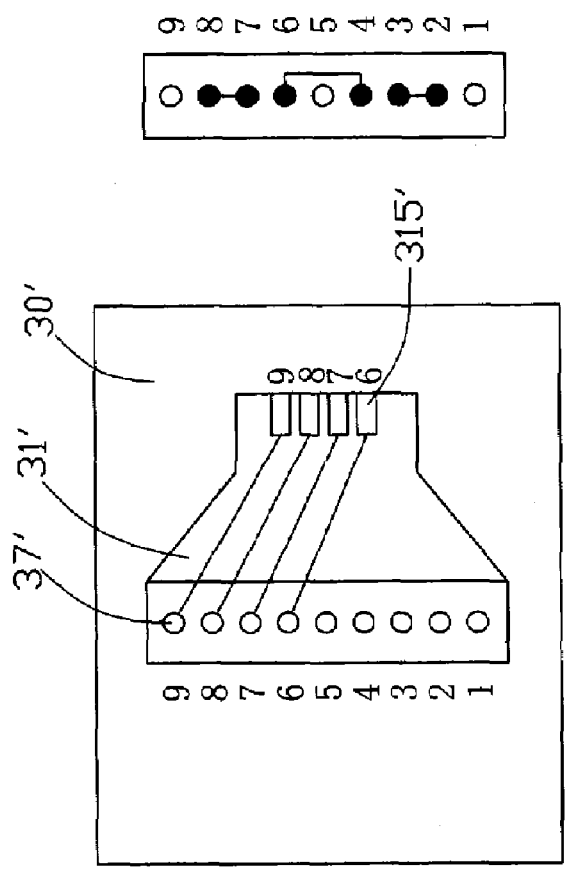
FIG. 6 is a sketch view of another testing card of another embodiment of the present invention, showing a front, a back, and a top aspects of the another testing card.
Figure 6:
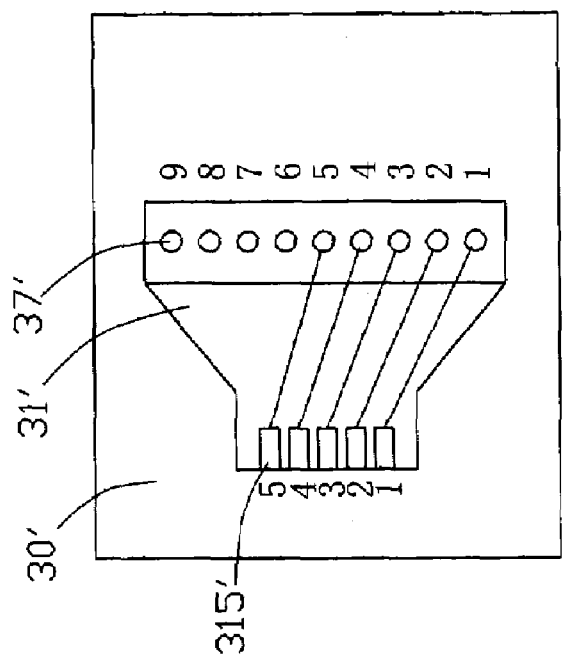

Referring to FIG. 6, another embodiment of a testing card 30' is shown. The testing card 30' includes a second connector 31' connected to the first connector 13.

The second connector 31' includes nine pads 315' corresponding to pins 1 to 9 of the first connector 13 respectively. The pads 315' are aligned in a same order as the pins 1 to 9 of the first connector 13.

The second connector 31' further includes nine terminals 37'. Each of the terminals 37' is connected to the corresponding pad 315' respectively.

When the I/O port needs to be tested, the nine terminals 37' are connected in a variety of combinations to form a desired testing circuit to test a aspect of the I/O port. For example in FIG. 6, the second and third terminals 37' are connected together, the fourth and sixth terminals 37' are connected together, the seventh and eighth terminals 37' are connected together, and other terminals 37' are not connected to other terminal 37. By changing the combination of the nine terminals 37', different aspects of the I/O port can be tested.

Figure 7:
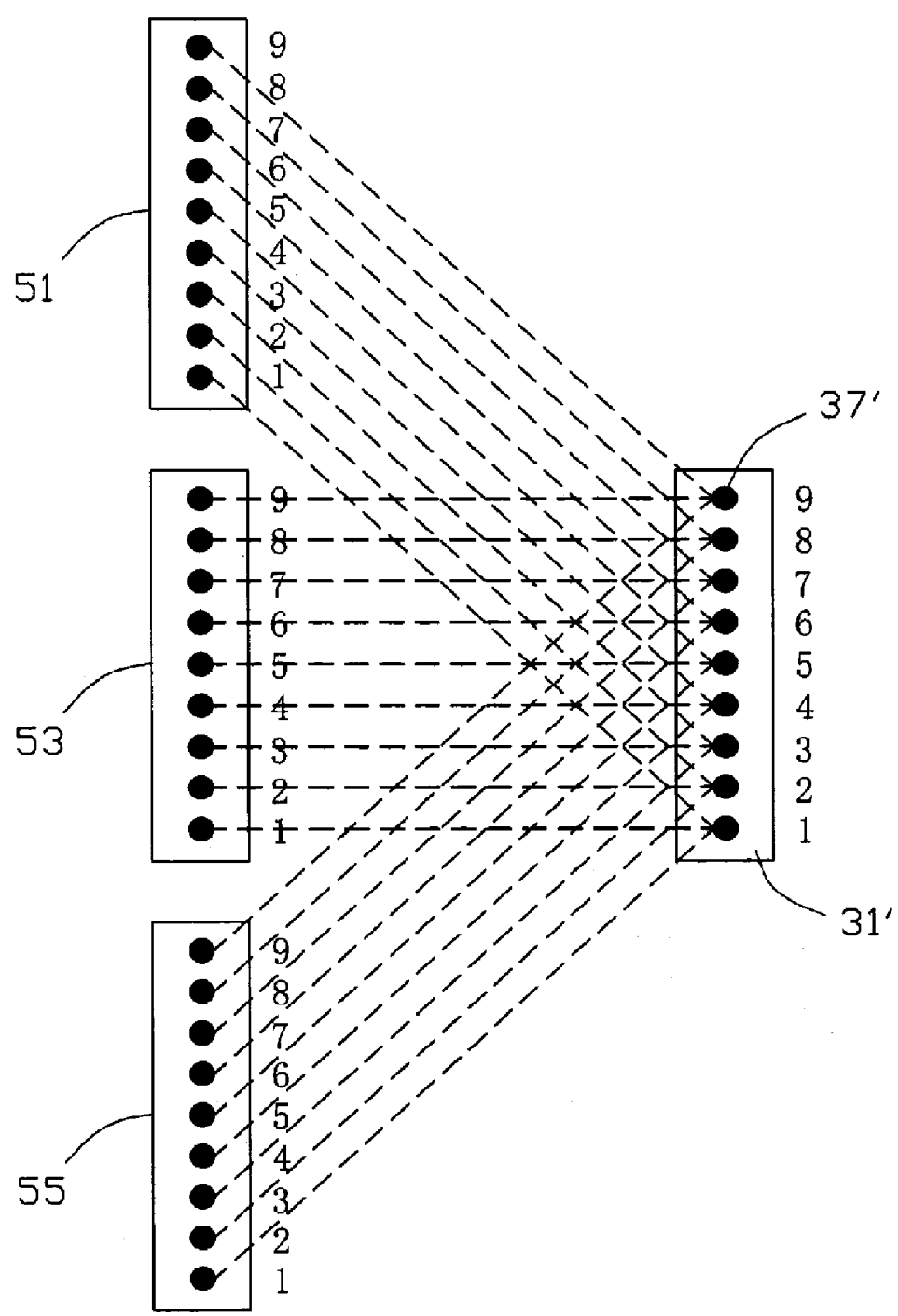
FIG. 7 is a sketch view of a second connector of FIG. 6 connected to more than one port.

Referring to FIG. 7, three connectors 51, 52, and 53 are the same type connector as the second connector 31'. Each of the terminals 37' of second connector 31' is connected to corresponding terminal of the connectors 51, 52, and 53 at the same time. The second connector 31' is connected to a control I/O port (not shown), and each of the connectors 51, 52, and 53 is connected to a testing I/O port (not shown). Pins of the testing I/O ports connected to the connectors 51, 52, and 53 are controlled by changing signals on pins of the control I/O port connected to the second connector 31'. It is convenient to testing a plurality of testing I/O port at the same time.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing tool for testing an I/O port, comprising:
a cable comprising a port formed at one end thereof and configured for being connected to the I/O port, and a first connector formed at an opposite end thereof; and
a testing card comprising two testing circuits and a second connector connected to the first connector, the second connector comprising a slider shiftable between a first position where the second connector and a testing circuit are interconnected, and a second position where the second connector and the other testing circuit are interconnected.

2. The testing tool as described in claim 1, wherein the first connector has a plurality of pins, the second connector has a plurality of pads, and each of the plurality of pads is connected to a corresponding pin of the plurality of pins of the first connector for connecting the first connector and the second connector.

3. The testing tool as described in claim 2, wherein the slider comprises a plurality of contact pieces divided into two groups, and each group of contact pieces interconnects the plurality of pads of the second connector and a corresponding testing circuit.

4. The testing tool as described in claim 3, wherein each of the two groups of contact pieces is aligned alternately with the other group of contact pieces.

5. The testing tool as described in claim 2, wherein the pads of the second connector are aligned in a same order as the pins of the first connector.

6. The testing tool as described in claim 5, wherein the pins of the first connector are aligned according to pin's sequence number.

7. The testing tool as described in claim 5, wherein the pins of the first connector are aligned according to frequency of use of each pin in a test process.

8. The testing tool as described in claim 1, wherein the port is a 9 pin serial connector.

9. A testing tool for testing an I/O port, comprising:
a cable comprising a port formed at one end thereof and configured for being connected to the I/O port and a first connector formed at an opposite end thereof; and
a testing card comprising a second connector connected to the first connector, the second connector comprising a plurality of terminals connected to the first connector;
wherein the plurality of terminals of the second connector are connected in a variety of combinations to form different testing circuit.

10. The testing tool as described in claim 9, wherein the first connector has a plurality of pins, the second connector has a plurality of pads, and each of the plurality of pads is connected to a corresponding pin of the plurality of pins of the first connector for connecting the first connector and the second connector.

11. The testing tool as described in claim 10, wherein each of the plurality of terminals is connected to the corresponding pad of the plurality of pads of the second connector.

12. The testing tool as described in claim 10, wherein the pads of the second connector are aligned in a same order as the pins of the first connector.

13. The testing tool as described in claim 12, wherein the pins of the first connector are aligned according to pin's sequence number.

14. The testing tool as described in claim 12, wherein the pins of the first connector are aligned according to frequency of use of each pin in the test process.

15. A testing tool for testing an I/O port, comprising:
a cable comprising a port formed at one end thereof and configured for being connected to the I/O port and a first connector formed at an opposite end thereof, the port having a plurality of pins; and
a testing card comprising different testing circuits and a second connector connected to the first connector, the second connector comprising a plurality of pads corresponding to the pins of the port of the cable respectively;
wherein the pads of the second connector are capable of being selectively connected to any one of the testing circuits.

16. The testing tool as described in claim 15, wherein the second connector comprises a slider shiftable between different positions corresponding to the different testing circuits, the second connector connecting one of the different testing circuits in the different positions.

17. The testing tool as described in claim 15, wherein the second connector comprises a plurality of terminals connected to the corresponding pads of the second connector, the terminals of the second connector being connected in a variety of combinations to form different testing circuits.

* * * * *